March 16, 1943.  E. F. LOWEKE  2,314,150
FLUID PRESSURE SYSTEM
Filed Aug. 16, 1940  2 Sheets-Sheet 1
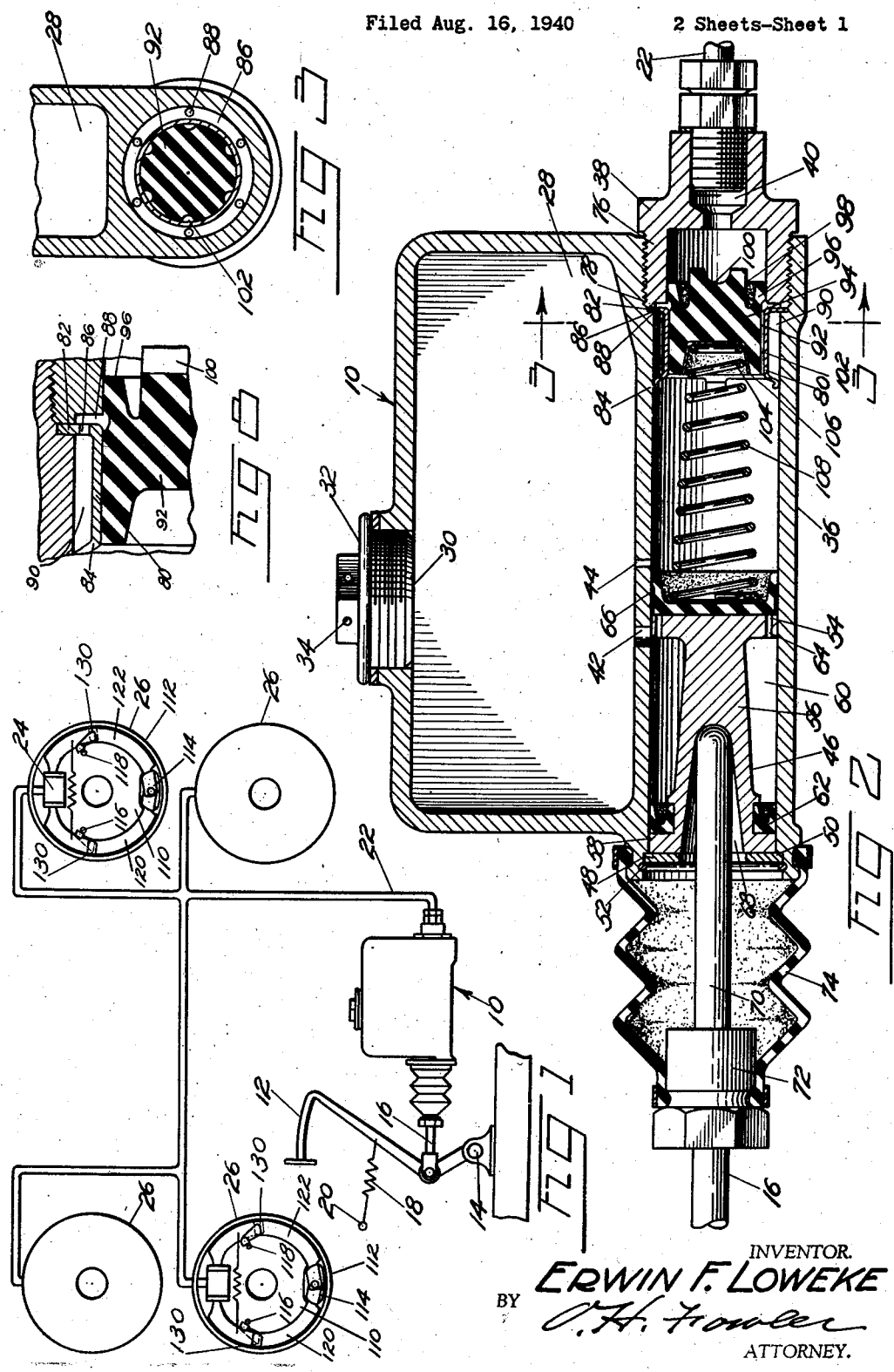
INVENTOR.
ERWIN F. LOWEKE
BY
ATTORNEY.

March 16, 1943.  E. F. LOWEKE  2,314,150
FLUID PRESSURE SYSTEM
Filed Aug. 16, 1940    2 Sheets-Sheet 2
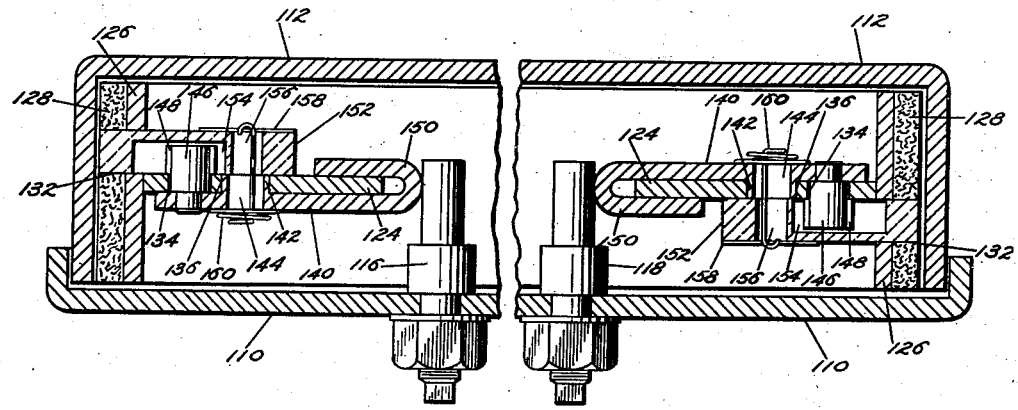
Fig 4
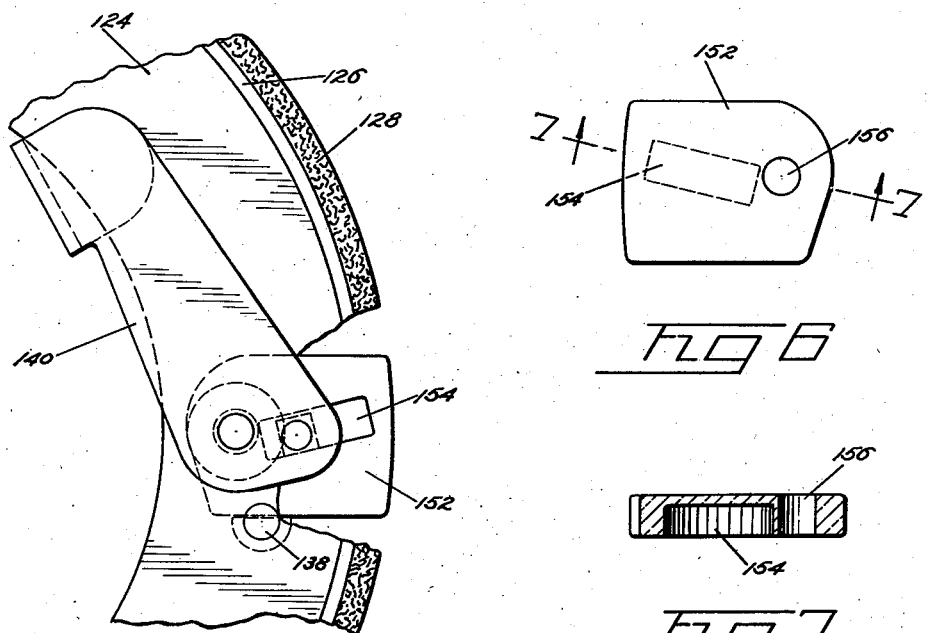
Fig 5
Fig 6
Fig 7
INVENTOR.
ERWIN F. LOWEKE
BY
ATTORNEY.

UNITED STATES PATENT OFFICE 2,314,150

FLUID PRESSURE SYSTEM

Erwin F. Loweke, Detroit, Mich., assignor to Hydraulic Brake Company, Detroit, Mich., a corporation of California Application August 16, 1940, Serial No. 352,974
In Canada October 10, 1939

6 Claims. (Cl. 60—54.6)

This invention relates to fluid pressure systems, and more particularly to fluid pressure producing devices for motor vehicles.

Broadly the invention comprehends a fluid pressure braking system for motor vehicles characterized in that the brakes associated with the wheels of the vehicle each includes a drum, friction means for cooperation with the drum, means for adjusting the friction means to compensate for wear thereof, a fluid pressure actuated motor for activating the friction means, means for retracting the friction means and motor together, and a manually operative fluid pressure producing device for actuating the motors having means effective, when the brakes are at rest, for maintenance of a positive pressure on the fluid in the system of slightly less magnitude than the retractile force of the retracting means.

An object of the invention is to provide a fluid pressure producing device having means effective when the system is at rest for maintenance of a positive pressure on the fluid in the system.

Another object of the invention is to provide a fluid pressure producing device including a cylinder having a piston movable therein for creating pressure, and a floating piston forward of the pressure creating piston for inhibiting the flow of fluid in the cylinder in one direction and providing by-passing the fluid in the other direction.

Other objects and advantages of the invention will appear from the following description taken in connection with the accompanying drawings forming a part of this specification, and in which—

Fig. 1 is a schematic view of a fluid pressure braking system embodying the invention;

Fig. 2 is a longitudinal sectional view through a preferred type of fluid pressure producing device;

Fig. 3 is a sectional view substantially on line 3—3, Fig. 2;

Fig. 4 is a sectional view of a brake, partly broken away;

Fig. 5 is a fragmentary view of a friction element and associated automatic adjuster;

Fig. 6 is a top plan view of the drum-engaging block; and

Fig. 7 is a sectional view substantially on line 7—7, Fig. 6.

Fig. 8 is an enlarged sectional view of the shell and floating piston structure.

Referring to the drawings for more specific details of the invention, a fluid pressure braking system illustrated in Fig. 1 includes a fluid pressure producing device indicated generally at 10. This fluid pressure producing device is of the type wherein the pressure created on the fluid is proportionate to the applied activating force.

The fluid pressure producing devices may be activated by a conventional foot pedal lever 12 rockable on a stub shaft 14. A thrust rod 16 serves to connect the foot pedal lever to the compression element of the device, and a spring 18 connecting the lever to a fixed support 20 serves to return the lever to its retracted position.

A fluid pressure delivery pipe or conduit 22 suitably connected to the fluid pressure producing device has branches connected respectively to fluid pressure actuated motors 24 for actuating brakes 26. The motors are preferably arranged in pairs, one pair for actuating the brakes associated with the front wheels of the vehicle, and another pair for actuating the brakes associated with the rear wheels of the vehicle. The brakes are of a preferred structure, to be hereinafter fully described.

The fluid pressure producing device 10 includes a reservoir 28 having a filling opening 30 normally closed by a plug 32 having openings 34 therethrough for venting the reservoir to the atmosphere. A cylinder 36 at the base of the reservoir has one end open and the other end closed as by a head 38 having a discharge port 40 to which may be suitably connected the fluid pressure delivery pipe or conduit 22. The cylinder also has spaced ports 42 and 44 providing communications between the reservoir and the cylinder. The port 42 is a supply port, and the port 44 is generally known in the art as a compensating port.

A piston 46 reciprocable in the cylinder 36 is held against displacement by a washer 48 seated on an annular shoulder 50 in the open end of the cylinder and secured in place as by a retaining ring 52 seated in a groove in the wall of the cylinder. The piston includes a head 54, a body portion 56, and a skirt 58. The body portion is reduced in diameter so as to provide in conjunction with the cylinder an annular chamber 60 communicating with the reservoir as by way of the supply port 42, and a sealing cup 62 fitted on the skirt inhibits seepage of fluid from the chamber 60 past the piston. The head 54 of the piston has a plurality of spaced passages 64 therethrough providing communications between the chamber 60 and that portion of the cylinder forward of the piston, and a sealing cup 66 seated on the head of the piston controls the passages.

The piston has in its back a recess 68 extended well into the body of the piston for the reception of one end of a thrust pin 70 having on its other end a coupling 72 connected as by a flexible boot 74 to the open end of the cylinder for the exclusion of dust and other foreign substances from the cylinder, and the coupling 72 is adaptable for reception of the thrust rod 16 connected to the foot pedal lever.

The head 38 of the cylinder includes a sleeve 76 threaded in the cylinder. The sleeve has an outer diameter slightly larger than the bore of the cylinder, an inner diameter smaller than the bore of the cylinder, and a concentric annular extension 78. A sleeve 80 having an inner diameter commensurate with the inner diameter of the sleeve 76 has a flange 82 clamped between the extension 78 of the sleeve 76 and the wall of the cylinder, and the sleeve 80 has a plurality of tangs 84 engaging the wall of the cylinder. The flange 82 and tangs 84 serve to support the sleeve 80 in axial alignment with the sleeve 76. The annular projection or extension on the sleeve 76 spaces the flange 82 on the sleeve 80 from the end of the sleeve 76 so as to provide an annular passage 86, and a plurality of spaced openings 88 in the flange 82 provide communications between the passage 86 and an annular chamber 90 between the sleeve 80 and the wall of the cylinder.

A piston 92, preferably rubber, reciprocable in the sleeves 76 and 80, has a head 94 provided with an annular sealing lip 96 adapted to yieldingly and slidably engage the walls of the sleeves 76 and 80, and a concentric extension 98 having a diametral groove 100. The extension 98 is adapted to seat on the head of the cylinder when the piston is fully advanced, and the groove in the extension provides communication between the sleeve 76 and the discharge port 40 when the piston is seated on the head. The body of the piston has a plurality of spaced longitudinal channels 102 extending from the base of the sealing lip 96 to the back of the piston, and a recess 104 in the back of the piston provides a spring seat 106 for the reception of one end of a spring 108 having its other end seated in the sealing cup 66 on the head of the piston 46.

In a normal operation, upon depressing the foot pedal lever 12, force is transmitted therefrom through the rod 16 to the piston 46, resulting in moving the piston on its compression stroke. During the initial movement of the piston, the cup 66 on the head thereof closes the port 44, and thereafter, as the piston proceeds on its compression stroke, fluid in the cylinder forward of the piston is displaced therefrom through the channels 102 and openings 88, past the lips 96 on the piston 92, through the sleeve 76, the discharge port 40 and fluid pressure delivery pipe or conduit 22, into the fluid pressure actuated motors 24, resulting in energization of the motors and the consequent actuation of the brakes with sufficient force to effectively retard rotation of the drums associated with the wheels of the vehicle. The frictional resistance between the piston 92 and the sleeve 80 is sufficient to resist movement against the resiliency of spring 108 for at least a portion of the stroke of piston 46. Together with the consequent increase in pressure on the fluid as the piston 46 is further advanced, the piston 92 is moved from its normal position until the extension 98 seats on the head of the cylinder. Further advance of the piston 46 results in passing fluid from the cylinder through the diametral groove 100 into the discharge port 40 to the fluid lines 22.

Upon concluding a braking operation and release of the applied force, the foot pedal lever 12 is returned to its retracted position under the influence of the retractile spring 18. This results in release of the piston 46 and return of the piston to its retracted position under the influence of the spring 108. As the piston 46 returns to its retracted position, a partial vacuum is created in that portion of the cylinder forward of the piston, resulting in drawing fluid from the reservoir 28 through the supply port 42 into the annular chamber 60, thence through the passages 64 in the head of the piston 46, past the sealing cup 66, into that portion of the cylinder forward of the piston, completely filling the cylinder.

During this operation, fluid in the fluid pressure actuated motors 24 and the fluid pressure delivery pipe or conduit 22 and its branches connecting the motors to the cylinder is returning to the cylinder under the influence of retractile springs connecting the friction elements of the respective brakes 26.

Under this condition, the piston 92 is moved against the resistance of the spring 108 until the lip 96 on the head thereof uncovers the annular passage 86 so that fluid returning under pressure may enter the passage 86, then through the openings 88 and annular chamber 90 into the cylinder. This may result in the cylinder receiving a quantity of fluid in excess of its capacity, and under this condition the excess fluid is displaced from the cylinder through the compensating port 44 into the reservoir.

The floating rubber piston 92 serves to compensate for expansion and contraction of the fluid in the fluid pressure delivery pipe or conduit 22 and its branches, and in the fluid pressure actuated motors 24, and to maintain a positive pressure in these instrumentalities, the maintained pressure being commensurate with the tension on the spring 108.

Each of the brakes 26 includes a fixed support or backing plate 110, adapted to be secured to an axle or to an axle housing, and a rotatable drum 112 associated with the backing plate and adapted to be secured to a wheel. The backing plate has arranged thereon an anchor 114 and a pair of adjustable retractile stops 116 and 118.

A pair of corresponding interchangeable friction elements or shoes 120 and 122 are pivoted on the anchor for cooperation with the drum. Each of the shoes includes a web 124 supporting a rim 126 having suitably secured thereto a friction lining 128 for cooperation with the drum.

Mounted on the shoes in reverse position are automatic adjusters, indicated generally at 130. As shown, the rims and linings of the shoes are slotted as at 132, and the webs of the shoes are provided with arcuate slots 134, transverse bores 136, and suitably arranged on the webs are guide pins 138. A lever 140 fulcrumed on each shoe has as its fulcrum a lateral sleeve 142 coextensive with a bore 144 through the lever, and the sleeve is fitted for rotation in the bore 136 in the web. A pin 146 on one end of the lever extends through the arcuate slot 134, and loosely sleeved on this pin is a washer 148 having a rectangular perimeter, the object of which will hereinafter appear. The other end of the lever is bent parallel to the body portion of the lever, as indicated at 150, so as to embrace the web of the shoe to inhibit rattle and to provide for suitable engagement with the adjacent retractile stop.

A block 152 has a diagonal slot 154 extended partly through the block and a transverse bore 156 adjacent one end of the slot. One end of the block has a radius commensurate with the radius of the shoe, and this end of the block is fitted for movement in the slot 132 through the rim and lining of the shoe, and is adapted to engage the drum. The diagonal slot 154 in the block receives the washer 148 on the pin 146 carried by the lever 140, and the bore 156 in the block registers with the bore 144 in the lever and the coextensive sleeve 142, and one edge of the block slidably engages the guide pin 138. A light plate 158 flapped against the block over the bore 156 has secured thereto a spring 160 superimposed on the lever 140. This spring serves to frictionally clamp the block to the web of the shoe.

Because of a differential in the coefficient of friction of the linings on the shoes and the blocks, in normal braking operations there is relative movement between the shoes and the blocks. This movement of the blocks is proportionate to wear on the linings on the shoes, and is transversely of the shoes against resistance imposed by the springs 160, and during this movement the rectangular washer 148 in the diagonal slot 154 of the block slides in the slot, and this movement of the washer is transmitted to the lever and imparts slight movement of the lever on its fulcrum, so that upon the conclusion of a braking operation and return of the shoes to retracted position the levers engage the retractile stops, and support the shoes in proper spaced relation to the drum. Because of the wedging action on the blocks between the guide pins 138 and the rectangular washers 148 on the pins 146 carried by the levers, retrograde movement of the blocks is inhibited. This is of vital importance because of the tendency to mal-adjustment of the blocks, due to the snapping action of the retractile springs connecting the shoes, upon release of the brake at the conclusion of a braking operation. To reduce wear on the drum to the minimum, the adjusters are arranged in reverse position with respect to one another so that in a given brake structure the wear on the drum may be spread over substantially twice the area of a brake structure wherein adjusters are arranged diametrically opposite one another. This has also highly important advantages, in that the adjusters may be alike in structure, and, accordingly, the cost of production may be greatly reduced.

While this invention has been described in connection with a specific embodiment, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder, a plug on the head of the cylinder having a discharge port therethrough, a shell supported between the plug and cylinder, a piston movable in the cylinder for creating pressure, a floating piston reciprocable in the shell and plug, means in the floating piston for the passage of fluid in one direction, means in the floating piston for by-passing fluid in the other direction, and a spring interposed between the pistons.

2. A fluid pressure producing device comprising a cylinder, a piston movable therein, a shell supported in the cylinder forward of the piston having passages therethrough, a floating piston reciprocable in the shell having longitudinal channels commensurate the inner wall of the shell for the passage of fluid therethrough, an extension on the floating piston limiting movement in one direction, a spring interposed between the pistons resisting movement of the floating piston in the other direction, and means in the floating piston inhibiting flow of fluid in one direction.

3. A fluid pressure producing device comprising a reservoir, a cylinder supplied therefrom having a head threaded thereon having a discharge port therethrough, a shell fixedly secured in the head having passages therethrough, a piston movable in the cylinder for creating pressure, a floating piston reciprocable in the shell for maintaining pressure, passages through the floating piston for the passage of fluid in one direction, said shell and floating piston cooperating to provide for passage of the fluid in the other direction, an extension on the floating piston limiting movement in one direction, and a diametral groove in the extension for cooperation with the discharge port.

4. A fluid pressure producing device comprising a cylinder, a plug on the head of the cylinder having a discharge port therethrough, a shell supported between the plug and cylinder having passages therethrough, a piston movable in the cylinder, a floating piston reciprocable in the shell and plug having longitudinal channels therethrough, a circumferential lip on the floating piston embracing the wall of the plug, an extension on the floating piston including a diametral groove, a recess in the floating piston, and a spring interposed between the pistons and received by the recess in the floating piston.

5. A fluid pressure producing device comprising a cylinder, a head on the cylinder having a discharge port therethrough, a shell supported on the head of the cylinder providing in conjunction with the cylinder an annular passage, a piston movable in the cylinder for creating pressure, a floating piston movable in the shell and head of the cylinder having passages therethrough, and means on the head of the floating piston for controlling the flow of fluid through the floating piston in one direction, said annular passage providing communication between the head of the cylinder and that portion back of the floating piston upon the retraction of the floating piston from the head of the cylinder.

6. A fluid pressure producing device comprising a cylinder, a head on the cylinder comprising a chamber of lesser diameter than the cylinder, a shell supported within the cylinder by the cylinder and head of the cylinder of equal diameter to the head chamber, said shell having passages therethrough, a piston movable in the cylinder for creating pressure, a floating piston reciprocable in the shell and head chamber comprising head and body portions, said body having a plurality of peripheral passages therethrough, and means on the head of the floating piston for controlling the flow of fluid through the peripheral passages in one direction, said passages in the shell providing communication between the cylinder and head chamber upon retraction of the floating piston from the head chamber.

ERWIN F. LOWEKE.